US006698462B2

(12) United States Patent
Schneider

(10) Patent No.: US 6,698,462 B2
(45) Date of Patent: Mar. 2, 2004

(54) AUTOMATIC SOLUTION DISPENSER

(75) Inventor: Scott Schneider, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/843,886

(22) Filed: Apr. 30, 2001

(65) Prior Publication Data

US 2002/0157725 A1 Oct. 31, 2002

(51) Int. Cl.[7] .................................................. B65B 1/04
(52) U.S. Cl. ............................ 141/2; 141/94; 141/96; 141/129; 141/192
(58) Field of Search ........................... 141/2, 18, 21, 141/83, 94, 95, 96, 99, 100, 102–104, 129, 130, 192, 198, 234, 237, 392; 222/146.6, 152, 504, 509

(56) References Cited

U.S. PATENT DOCUMENTS

| | | | | |
|---|---|---|---|---|
| 5,491,333 A | * | 2/1996 | Skell et al. ............... 250/222.1 |
| 5,603,363 A | * | 2/1997 | Nelson ........................ 141/351 |
| 5,628,349 A | * | 5/1997 | Diggins et al. ................. 141/3 |
| 5,890,520 A | * | 4/1999 | Johnson, Jr. .................. 141/94 |
| 6,116,298 A | * | 9/2000 | Haimovich et al. ........... 141/94 |
| 6,354,343 B1 | * | 3/2002 | Strnad et al. .................. 141/94 |

* cited by examiner

*Primary Examiner*—Timothy L. Maust

(57) ABSTRACT

Assemblies and methods for automatically and electronically controlling and directing the input of solutions into solution receptacles are disclosed. An assembly may deliver an electronic, computer-generated signal having a specific address via hardwires or using wireless methods. One assembly includes a solution reservoir, a solution receptacle feeder and a computer to control the delivery of solution to a solution receptacle. The assembly may also include a number of transmitters, receivers, or transceivers for delivering the computer-generated signals. The assembly may also include any of variety of mechanisms for use in mobilizing the solution delivery assembly or the solution receptacles or both. Each of the solution receptacles for use of the assembly may have its own identifier.

11 Claims, 6 Drawing Sheets

AUTOMATIC SOLUTION DISPENSER

TECHNICAL FIELD

The invention relates to solution dispensing devices and methods of solution dispensing. More particularly, the invention relates to an automated, computer-driven solution dispensing assembly and method for dispensing solutions to one or more solution receptacles.

BACKGROUND ART

While not without merit, none of the previously known devices include the advantages of the present invention. Known techniques for liquid delivery require an individual to manually deliver liquid, using pipets and volumetric flasks or other liquid measuring devices. This process is often an expensive and labor-intensive task. The process may be fairly time-consuming and ultimately may be inadequate due to inaccurate volumetric measurement, spillage, and contamination of otherwise sterile liquids or containers.

SUMMARY

The present invention relates to an assembly for electronically controlling the input of solutions to a solution receptacle, including a solution receptacle feeder capable of receiving and reacting to an electronic signal and a computer capable of sending an electronic signal to the solution receptacle feeder. Certain embodiments of the present invention enable a user to deliver a precisely measured volume of liquid and control the timing of that delivery.

For purposes of the present disclosure, a solution receptacle should be understood to include any of a variety of devices useful for containing a liquid. Such devices would include, but are not limited to: plates, test tubes, other screw cap type tubes, cups, bowls, and other dishes.

The assembly may use hard wires between the computer and the solution delivery portion of the assembly, or alternatively, may use wireless transmission of the signal generated by the computer. The assembly is preferably constructed such that the volume of liquid delivered to a receptacle may be precisely controlled. Similarly, the assembly may control the timing of liquid delivery, thus the assembly may be used to deliver liquid to a receptacle on a set schedule as desired by a particular user. For instance, a computer may be programmed to send a delivery instruction to the solution receptacle feeder once every three hours, or over a period of days, or as otherwise desired by the user.

In one embodiment of the invention, the assembly is constructed so that the solution receptacle feeder may be moved among a variety of different receptacles so that only one feeder is necessary to service a variety of receptacles. In such an embodiment, a mechanism is included to move the solution receptacle feeder among the different receptacles and precisely position the feeder so that the solution is delivered to the receptacle without any splashing or spillage of the liquid.

In yet another embodiment of the present invention, a mechanism is included by which to move the solution receptacles, so that one solution receptacle feeder may be used with a variety of solution receptacles. In this embodiment, the computer generates and sends an address instruction to the mechanism responsible for receptacle position so the mechanism can precisely position the desired receptacle in relation to the solution receptacle feeder. When properly positioned as such, the solution receptacle feeder receives a signal from the computer directing the solution receptacle feeder to deliver a particular volume of solution to the solution receptacle. This enables the assembly to deliver a precise volume of liquid to a receptacle with no splashing or spillage.

Additional advantages and novel features of the present invention will be set forth in part in the description which follows and in part will become apparent to those skilled in the art upon examination of the following or may be appreciated by practice of the invention.

DETAILED DESCRIPTION OF PREFERRED EMBODIMENTS

For simplicity and illustrative purposes, the principles of the present invention are described by referring mainly to various exemplary embodiments thereof. Although the preferred embodiments of the invention are particularly disclosed herein, one of ordinary skill in the art will readily recognize that the same principles are equally applicable to, and can be implemented in, a variety of other systems, and that any such variation would be within the modifications that do not depart from the true spirit and scope of the present invention. Before explaining the disclosed embodiments of the present invention in detail, it is to be understood that the invention is not limited in its application to the details of any particular arrangement shown, since the invention is capable of other embodiments. Also, the terminology used herein is for the purpose of description and not of limitation.

Figure 1:
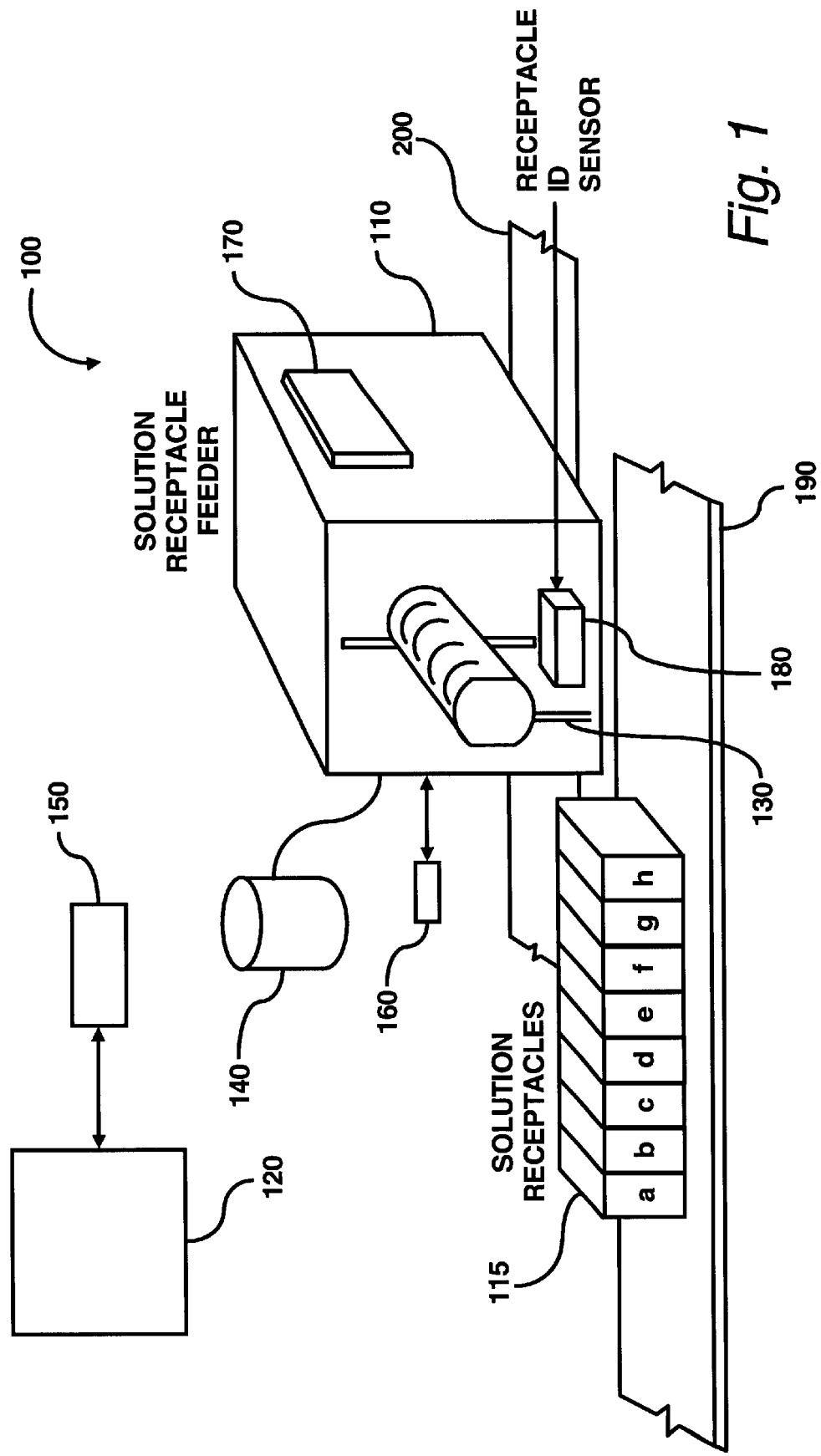
FIG. 1 shows an elevated perspective view of one embodiment of an assembly for electronically controlling the input of solutions.

FIG. 1 shows an elevated perspective view of one embodiment of an assembly 100 for electronically controlling the input of solutions to a solution receptacle, including a solution receptacle feeder 110 capable of receiving, transmitting, and processing to an electronic signal, as well as a computer 120 capable of sending and receiving an electronic signal to the solution receptacle feeder 100. The solution receptacle feeder 110 includes any of a wide variety of devices that would permit or allow the controlled delivery of a solution to a solution vessel or solution receptacle 115a–h.

In accordance with one embodiment of the present invention, a solution receptacle feeder 110 works in response to an electronic signal sent by a computer 120. The solution receptacle feeder 110 may be either permanently or removably attached to a housing unit (not shown). The solution receptacle feeder 110 may be constructed with one or more jets 130, such that solution is delivered under pressure, or otherwise forced into a solution receptacle 115a–h, as might be useful where the liquid needs to be delivered through a tube or into a particular atmospheric environment. The jets 130 might also be useful where a single solution receptacle feeder is used to deliver a variety of solutions and its is important to avoid contamination of one solution with another as might be a case if a single jet were delivering multiple solutions at different times since some of the first delivered solution would likely remain in the jet after delivery. Any of a variety of the conventional solution delivery mechanisms may be suitable for use with the present system. This would include incorporation of inkjet technology as is typically used to deliver liquid dye or ink to paper. It should be appreciated that such inkjet technology is capable of automated delivery in precise volumes, and its use in the present context could be advantageous.

Alternatively, the solution receptacle feeder 110 may simply work through operation of gravity as in the case where the solution receptacle feeder 110 works by opening an aperture at the bottom of a solution reservoir 140 such that the solution will flow through the aperture and eventually is directed into a solution receptacle 115*a–h*. Controlling the size of the aperture and the amount that it is opened, as well as the length of time that the aperture is opened, effectively controls the volume of liquid which flows through that aperture. One solution receptacle feeder 110 may be suitable for a wide variety of applications, especially among liquids having varying viscosities, since the aperture may be opened to varying degrees or lengths of time.

The computer 120 includes, but is not limited to, any device capable of generating and sending an electronic signal, including an instruction for the solution receptacle feeder 110 to deliver solution. The computer 120 may also be capable of including an address component with the data instruction set or directions it sends. This address enables a single computer 120 to service a variety of solution receptacle feeders 110 or other devices. The computer 120 may communicate with the solution receptacle feeder 110 via a communication system.

Preferably, each solution receptacle feeder 110 includes an electronic self-identification component. This self-identification is such that a solution receptacle feeder 110 will only follow those directions addressed specifically to that solution receptacle feeder 110. The computer 120 may send an instruction set including an address component to a variety of solution receptacle feeders 110 or other devices. Each of the solution receptacle feeders 110 would receive this instruction set and first check the address component to determine whether or not the particular instruction set is intended for that solution receptacle feeder 110. Thus the computer 120 preferably includes a transceiver 150. Preferably each solution receptacle feeder 110 would also include a transceiver 160. In certain instances the transceiver 150 or 160 is not required, and may be substituted by either a transmitter or a receiver, as it is appropriate for the particular application.

Each solution receptacle feeder 110 would also preferably include a warning device 170. The warning device 170 is such that it provides notice of system malfunction or failure. The warning device 170 may provide an auditory alarm, a visual alarm, and it may send a signal through the transceiver 160 back to the computer 120 to notify of the system malfunction or failure.

Preferably, the solution receptacle feeder 110 can control the amount of liquid released into each solution receptacle 115*a–h* as directed by the instruction or dataset sent from the computer 120. As previously indicated, this control may be achieved by the degree to which an aperture is opened on a solution receptacle feeder 110 or the length of time that an aperture is opened on the solution receptacle feeder 110 or, in the case of a pressurized solution receptacle feeder 110, the amount of pressure exerted upon the liquid to force it out of the solution receptacle feeder 110.

The computer 120 may control the timing of the solution delivery. For instance, delivering liquid on a set schedule once every few hours or on a daily, weekly or perhaps even monthly schedule. This timing is preferably controlled through control of the signal delivery construction set to the solution receptacle feeder 110.

In another embodiment, the invention includes a solution reservoir 140 attached to the solution receptacle feeder 110. The solution reservoir 140 may include any of a variety of suitable receptacles for holding a liquid. Such receptacles may vary widely in construction materials, shape, size, and appearance. Suitable solution reservoirs 140 may include a mechanism for monitoring and controlling the atmosphere within the receptacle so as to preserve certain chemical characteristics within the solution contained therein. Alternatively, the solution reservoir may 140 also include a suitable device to control the temperature of the liquid contained therein at either an increased or decreased temperature relative to the ambient room or outdoor temperature.

In yet another embodiment of the present invention, the solution receptacle feeder 110 is constructed so that it may feed solution to one or more solution receptacles. There are a variety of ways this end may be achieved. In one embodiment, each of the solution receptacles 115*a–h* remains in place while the solution receptacle feeder 110 moves among the solution receptacles 115*a–h* so that it may deliver solution to each of the solution receptacles 115*a–h*. In this embodiment, the solution receptacle feeder 110 preferably includes a receptacle identification member sensor 180. Each solution receptacle 115*a–h* would then include an identification member (not shown). The receptacle identification member sensor 180 employees conventional methods to detect and recognize the identification member from the solution receptacle 115*a–h* placed before it. These conventional methods would include, but are not limited to, bar coding, electronic card keys, and recognition chips or circuits. Preferably the solution receptacle feeder 110 is constructed to shield or insulate the identification member of each individual solution receptacle 115*a–h* before it from that of other solution receptacles 115*a–h*. The recognition procedure may involve sending information retrieved from the identification member back to the computer 120, and the computer 120 retrieving appropriate information regarding solution delivery for that particular solution receptacle 115*a–h* and sending that information back to the solution receptacle feeder 110. Thus, all solution receptacles 115*a–h* that are to be similarly treated in terms of solution delivery may include the same identification member data. Alternatively, the solution receptacle feeder 110 may have standing instructions on what process to perform in the case of certain predefined identification member data.

In yet another embodiment of the present invention, the assembly for electronically controlling the input of solutions 100 to a solution receptacle 115 includes multiple solution receptacles 115*a–h* each of which includes, or is attached to, a transportation mechanism 190 for moving the solution receptacles 115*a–h*. In this way, a single solution receptacle feeder 110 may separately deliver solution to a variety of different solution receptacles 115*a–h*. The transportation mechanism 190 may include any of a variety of conventional methods for the controlled movement of articles from one position to another including but not limited to conveyor belt systems. Preferably, the computer 120 employed in this embodiment sends an electronic signal which may include an address component to the transportation mechanism 190 which moves the solution receptacles 115a–h. This address component ensures that only the transportation mechanism 190 intended to act upon the instruction does so. The computer 120 is thereby able to send a signal out to each of the transportation mechanisms 190 for moving different solution receptacles 115a–h, the signal is then recognized by the intended transportation mechanism 190. Only the intended transportation mechanism 190 will respond to the instruction or dataset generated and sent by the computer 120.

Alternatively, the solution receptacle feeder 110 itself may be made mobile through a transportation mechanism 200. As with the transportation mechanism 190 for moving the solution receptacles 115a–h, this transportation mechanism 200 permits a single solution receptacle feeder 110 to separately deliver solution to a variety of different solution receptacles 115a–h. The transportation mechanism 200 may include any variety of conventional methods for the controlled movement of articles from one position to another, including but not limited to, conveyor belt systems. Preferably, the computer 120 employed in this embodiment sends an electronic signal which may include an address component to the solution receptacle feeder 110. This address component ensures that only the solution receptacle feeder 110 intended to act upon the instruction does so. The computer 120 is thereby able to send a signal out to a variety of solution receptacle feeder's 110 for servicing different solution receptacles 115a–h, the signal is then recognized by the intended solution receptacle feeder 110 and acted upon.

A variety of tracks or track layouts might be suitable for use with either the transportation mechanism 190 or the transportation mechanism 200. Where these mechanisms are conveyor belt type systems it should be appreciated that the conveyor belt layouts may include circular tracks, linear tracks, or any combination of the two.

In certain embodiments, it may be preferable to control the temperature of the solution receptacles 115a–h. The temperature may be directly controlled by providing either a heating or a cooling pad (not shown) as is appropriate for the particular application. This pad would sit directly above the conveyor belt, when a conveyor belt is used as the transportation mechanism 190. Alternatively the assembly may be constructed such that each of the solution receptacles 115a–h sit in a temperature controlled liquid bath. In such instance, the entire bath and the solution receptacles 115a–h within it would be moved by the transportation mechanism 190 or may sit still while the solution receptacle feeder 110 is moved as necessary to address each of the solution receptacles 115a–h.

In another embodiment, each solution receptacle 115 is manually placed in proper position for receipt of liquid from the solution receptacle feeder 110. The receptacle identification member sensor 180 may then recognize the identification member of the individual solution receptacle 115a–h placed before it. As previously described, upon recognition of the identification member data the solution receptacle feeder 110 may retrieve an instruction from the computer 120 or alternatively may be preprogrammed to act upon recognition of the particular identification member data.

Figure 2:
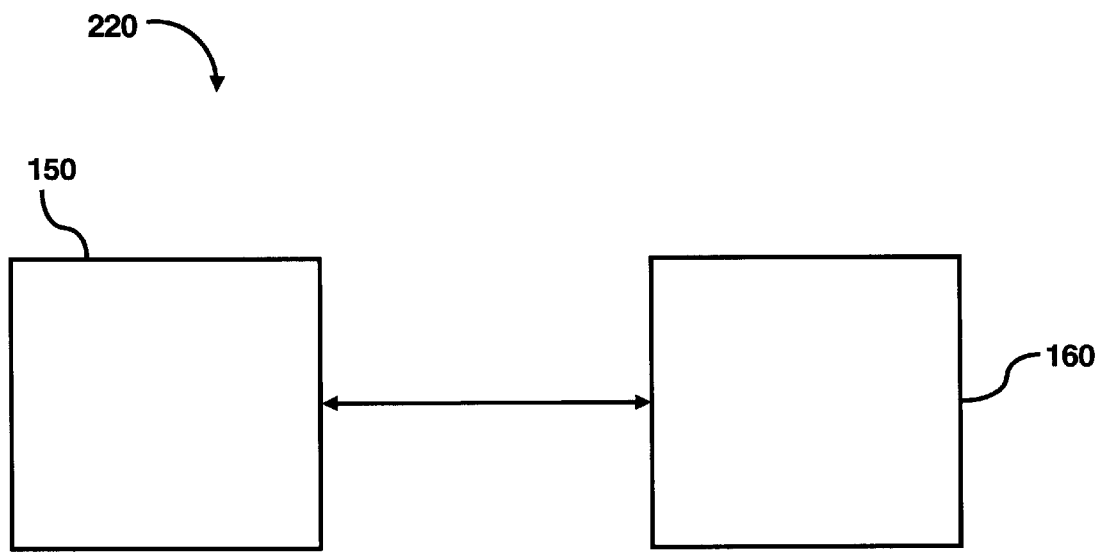
FIG. 2 shows a system diagram of a communication system.

FIG. 2 shows a system diagram of a communication system 220 between the transceiver 150 and transceiver 160. Preferably, the communication system 220 will provide for two way signal communication between transceiver 150 and transceiver 160. In certain embodiments two way signal communication may be required. The communication system 220 may provide for signal communication via hard wires or through a wireless communication. Wireless communication means any conventional method of wireless communication, including but not limited to, infrared, optical, microwave, and RF signal transmission, including BLUETOOTH.

Figure 3:
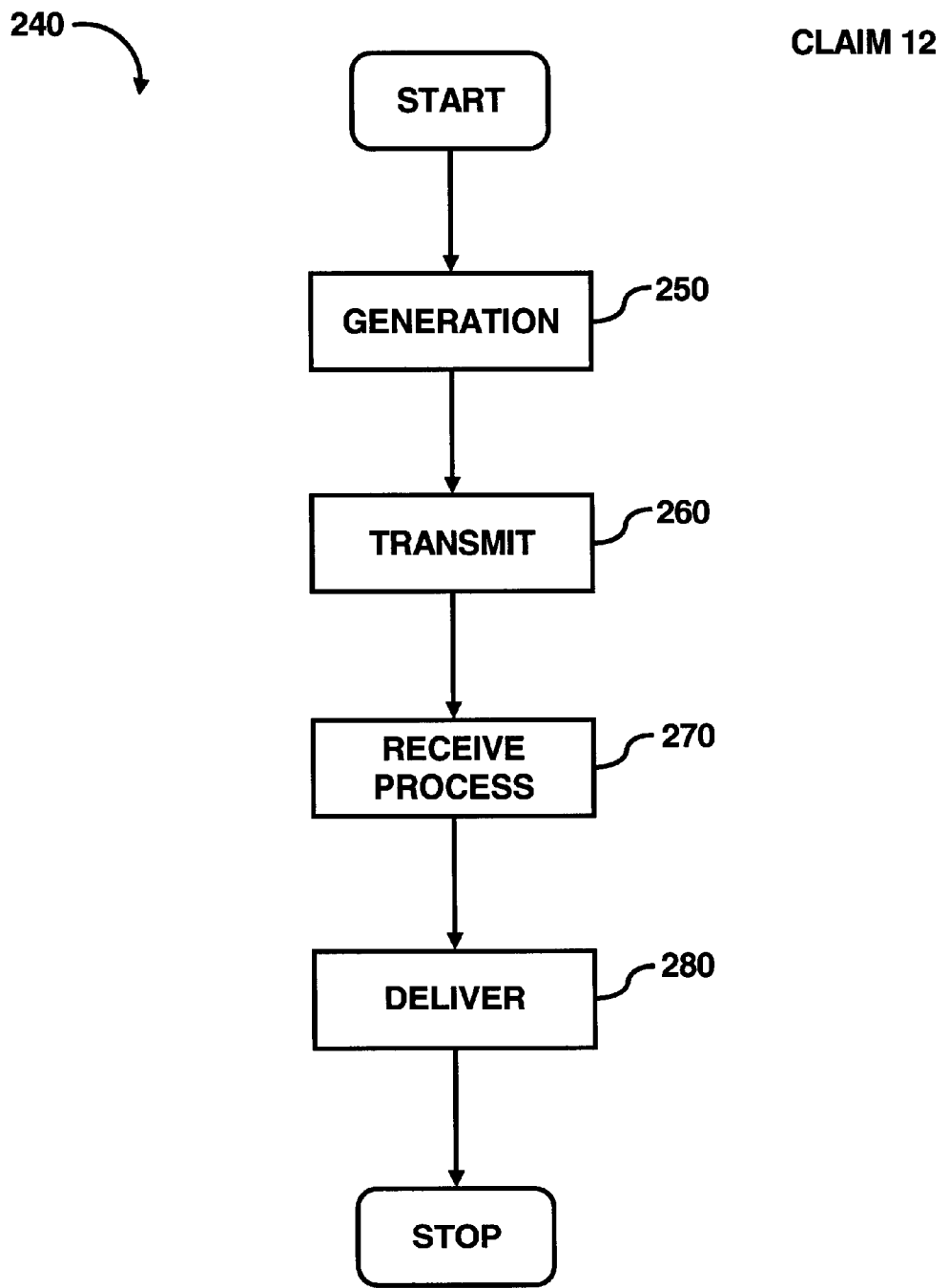
FIG. 3 shows the steps of a method for delivering solution.

FIG. 3 shows the steps of a method 240 for delivering solution to a solution reservoir. While FIG. 3 depicts a particular order of steps, it should be appreciated that the steps are not limited to the particular order or arrangement shown and that a method using a different order would still fall within the claims, scope, and spirit of the present invention. The method 240 comprises a variety of steps, which include generating 250 an electronic signal for a solution receptacle feeder. Preferably this electronic signal includes an instruction for the solution receptacle feeder. The instruction preferably causes the solution receptacle feeder to deliver solution. The electronic signal is then transmitted 260 to one or a variety of solution receptacle feeders. This transmission may occur in any of a variety of different ways as previously described, via traditional hard wires or through some wireless transmission. This wireless transmission may include use of transmitters, receivers, and transceivers. One or a variety of solution receptacle feeders then receive and process 270 the electronic signal. This step may use any of a variety of conventional methods of receiving and processing electronic signals that include instructions. Upon receipt and processing of an instruction to deliver solution, the solution receptacle feeder delivers 280 solution as instructed.

Figure 4:
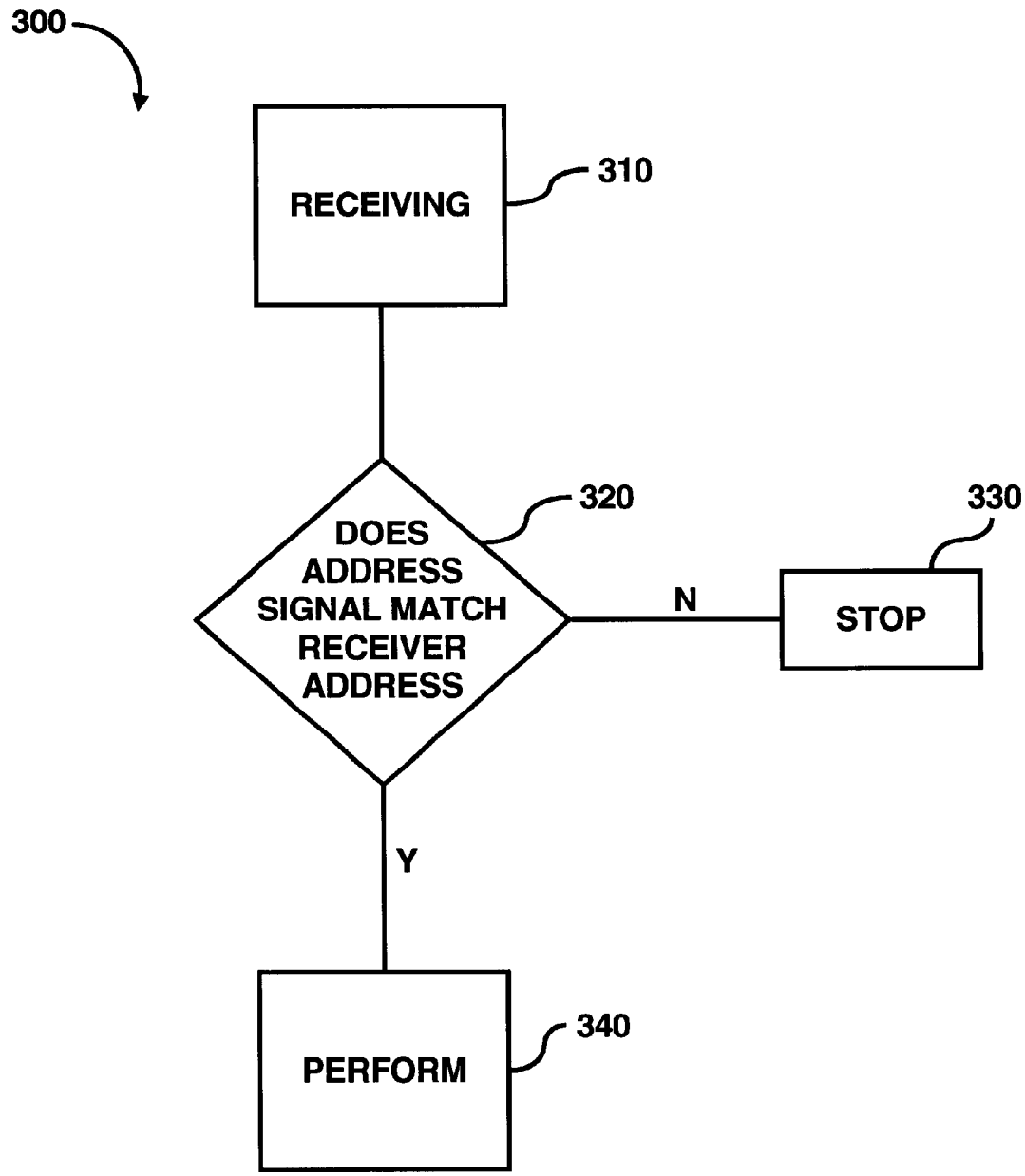
FIG. 4 shows the steps of a method used in certain embodiments of the present invention.

FIG. 4 shows the steps of a method 300 used in certain embodiments of the present invention. In certain embodiments, the electronic signal may include not only an instruction component, but also an address component. This address component ensures that only the intended solution receptacle feeder acts upon the instruction. Each solution receptacle feeder may have its own identifier such that the address component may be directed to a particular receptacle feeder's identifier. In this method, a solution receptacle feeder determines 320 whether the address component included within the electronic signal is intended for that particular solution receptacle feeder. The steps of the method 300 resemble those of FIG. 3 with the additional steps of including an address component with the electronic signal, determining 320 whether the address in a received signal matches that of a solution receptacle feeder, and delivering solution to a solution receptacle whenever the address in a received signal matches that of a solution receptacle. To achieve this function, each solution receptacle feeder must receive 310 the signal, and then compare 320 the address component of the signal with the solution receptacle feeder's individual identity to determine if the two match. If there is no match then processing of the instruction component of the signal should stop 330. Alternatively, the solution receptacle feeder might send a return signal indicating the lack of a match back to the computer. If the two do match, then the solution receptacle feeder should continue to process the instruction component of the signal and perform 340 that instruction.

Figure 5:
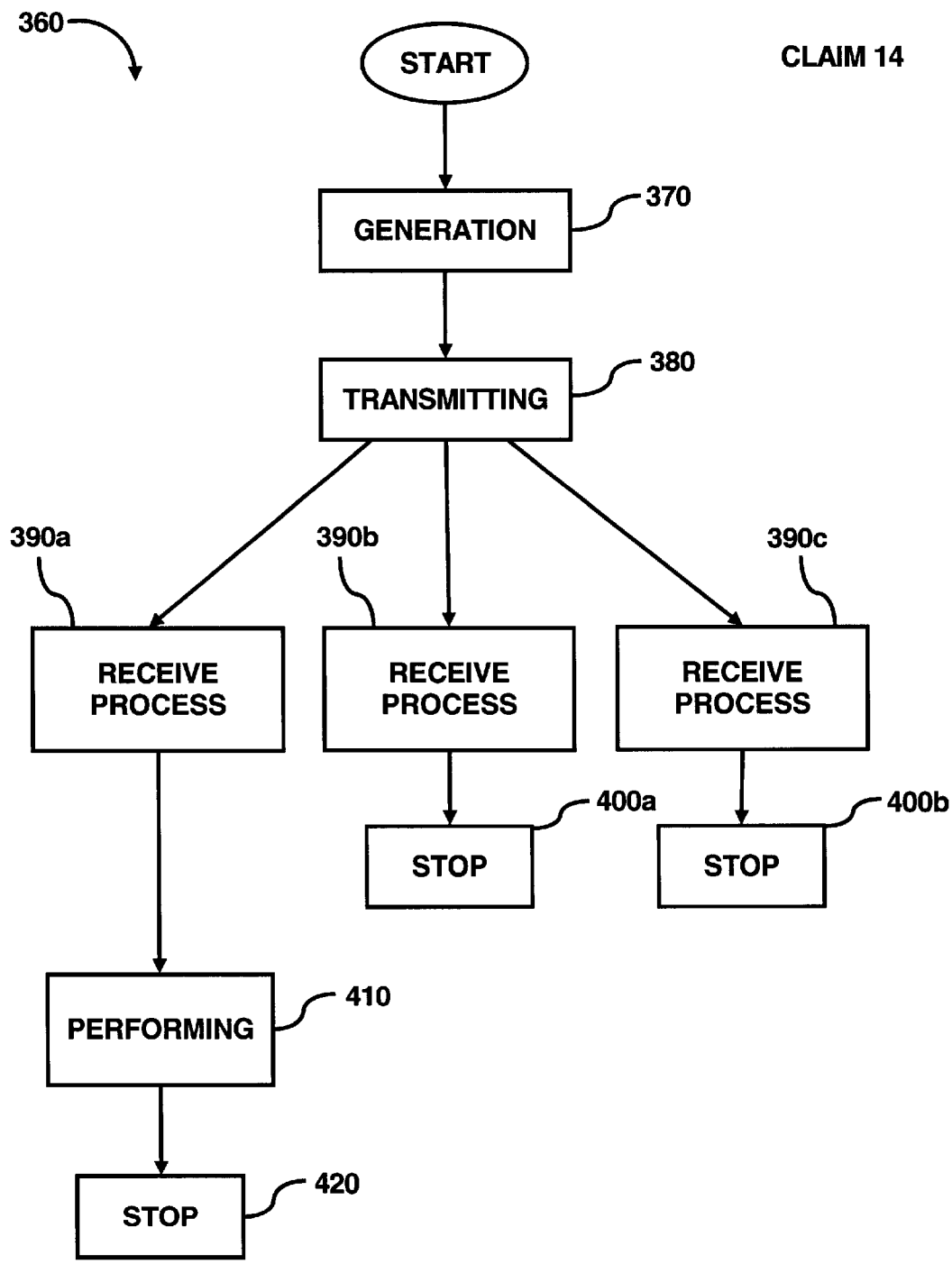
FIG. 5 shows a system diagram of a method used in certain embodiments of the present invention.

FIG. 5 shows a system diagram of a method 360 used in certain embodiments of the present invention. The method 360 includes the steps of generating 370 a signal with an address component and instruction component. The signal is then transmitted 380 to multiple solution receptacle feeders or transceivers associated therewith. Each of the solution receptacle feeders receives and processes 390*a*, 390*b*, and 390*c* the signal. In one embodiment, a decision-making process similar to that shown in FIG. 4 may be used to determine whether or not to act upon the instruction. If a solution receptacle feeder determines that it is not the intended recipient of the instruction, the method may stop 400*a*, 400*b* or may continue on in other respects for that solution receptacle feeder. If however, a solution receptacle feeder determines that it is the intended recipient of the instruction, the solution receptacle feeder performs 410 the instruction before stopping 420.

Figure 6:
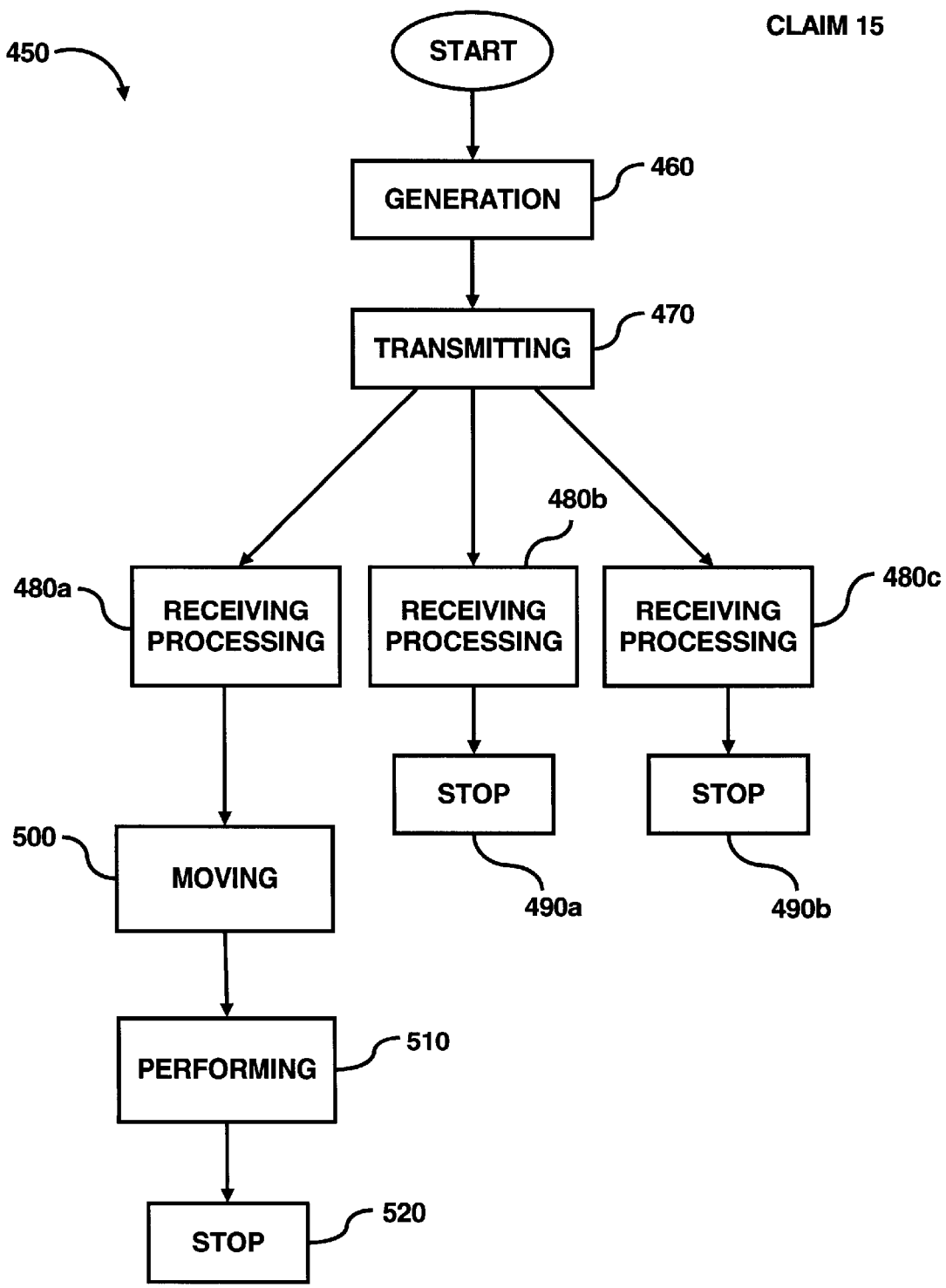
FIG. 6 shows a system diagram of a method similar to that depicted in FIG. 5.

FIG. 6 shows a system diagram of a method 450 similar to that depicted in FIG. 5. In this regard, the method 450 includes many similar steps to us that depicted in FIG. 5. The steps include generating 460, transmitting 470, receiving and processing 480*a*, 480*b*, 480*c*, and stopping 490*a*, 490*b*. If the solution receptacle feeder determines that it is the intended recipient of the instruction the solution receptacle feeder may move or reposition 500 itself as necessary for further performance 510 of the instruction set. In certain embodiments, such movement is intended to be incorporated within the concept of performance 510 of the instruction set.

In another embodiment, the receiving and processing steps 480*a*, 480*b*, 480*c* may be performed by a separate component, capable of moving one or more solution receptacles so there properly positioned to receive solution from a solution receptacle feeder. This step may be incorporated with a variety of the aforementioned embodiments to enable a fully automated system.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the present invention has been described by examples, a variety of devices would practice the inventive concepts described herein. While the invention has been described and disclosed in various terms and certain embodiments, the scope of the invention is not intended to be, nor should it be deemed to be, limited thereby and such other modifications or embodiments as may be suggested by the teachings herein are particularly reserved especially as they fall within the breadth and scope of the claims here appended. Those skilled in the art will recognize that these and other variations are possible within the spirit and scope of the invention as defined in the following claims and their equivalents.

What is claimed is:

1. An assembly for automatically controlling the input of a liquid to a liquid receptacle, the assembly comprising:

a liquid receptacle feeder for receiving and reacting to an electronic signal and including a self-identification component that identifies the liquid receptacle feeder; and a computer capable of sending an electronic signal to control the delivery of solution by the liquid receptacle feeder, wherein said signal indicates the volume of liquid to be delivered to the liquid receptacle and includes identification information corresponding to the self-identification component.

2. The assembly of claim 1 wherein the computer is capable of sending an electronic signal to the solution receptacle feeder to deliver solution to a solution receptacle and the assembly further comprises:

a solution reservoir attached to the solution receptacle feeder; and a solution receptacle.

3. The assembly of claim 1 further comprising:

a transceiver working in connection with the computer; and a second transceiver working in connection with each solution receptacle feeder such that each solution receptacle feeder will only follow directions addressed to a particular solution receptacle feeder.

4. The assembly of claim 1 wherein:

the computer includes a transmitter to send a wireless signal to the solution receptacle feeder, and the solution receptacle feeder includes a receiver to receive a wireless signal.

5. The assembly of claim 1 wherein:

the solution receptacle feeder includes hardware to control the amount of liquid released into the solution receptacle.

6. The assembly of claim 1 wherein:

the solution receptacle feeder includes a warning device to indicate malfunction.

7. The assembly of claim 1 wherein:

the computer includes software to control the timing of the solution delivery to the solution receptacle feeder.

8. A method of automatically delivering liquid to a liquid receptacle comprising the steps of:

generating an electronic signal representing an instruction for a liquid receptacle feeder, wherein the electronic signal includes identification information associated with a particular liquid receptacle feeder;

transmitting the electronic signal to one or more liquid receptacle feeders;

receiving and processing the electronic signal by the liquid receptacle feeders, wherein processing includes determining whether the signal includes identification information corresponding to a particular liquid receptacle feeder; and delivering liquid from a liquid reservoir to a liquid receptacle through the liquid receptacle feeder.

9. The method of claim 8 wherein the step of transmitting the electronic signal transmits a wireless signal.

10. The method of claim 8 further comprising the steps of:

including an address component with the electronic signal;

determining whether the address in a received signal matches that of a liquid receptacle feeder; and delivering liquid to a liquid receptacle whenever the address in a received signal matches that of a liquid receptacle feeder.

11. The method of claim 8 further comprising the steps of:

generating an electronic signal and including an address components and solution delivery instructions with the signal;

transmitting the electronic signal to one or more mechanisms for moving solution receptacle feeders;

receiving and processing the electronic signal by the one or more mechanisms;

moving the addressed solution receptacle feeder to an appropriate position in accordance with the delivery instructions using the appropriate mechanism; and delivering the solution to a solution receptacle.

* * * * *